(12) United States Patent
Costantino et al.

(10) Patent No.: US 10,804,767 B2
(45) Date of Patent: Oct. 13, 2020

(54) FLYWHEEL KINETIC ACCUMULATOR

(71) Applicant: SPINNING TOP ENERGY S.R.L., Milan (IT)

(72) Inventors: Giancarlo Costantino, Certosa di Pavia (IT); Alessandro Dondi, Borgarello (IT); Lauro Pagani, Desenzano del Garda (IT)

(73) Assignee: SPINNING TOP ENERGY S.R.L., Milan (IT)

( * ) Notice: Subject to any disclaimer, the term of this patent is extended or adjusted under 35 U.S.C. 154(b) by 0 days.

(21) Appl. No.: 16/314,785

(22) PCT Filed: Jul. 3, 2017

(86) PCT No.: PCT/IB2017/054009
§ 371 (c)(1),
(2) Date: Jan. 2, 2019

(87) PCT Pub. No.: WO2018/007931
PCT Pub. Date: Jan. 11, 2018

(65) Prior Publication Data
US 2019/0312482 A1 Oct. 10, 2019

(30) Foreign Application Priority Data

Jul. 5, 2016 (IT) ......................... 102016000069910

(51) Int. Cl.
*H02K 7/02* (2006.01)
*F16C 32/04* (2006.01)
(Continued)

(52) U.S. Cl.
CPC ......... *H02K 7/025* (2013.01); *F16C 32/0427* (2013.01); *H02K 7/09* (2013.01);
(Continued)

(58) Field of Classification Search
CPC ............ H02K 7/025; H02K 7/09; H02K 1/27; H02K 5/02; H02K 5/20; H02K 5/24;
(Continued)

(56) References Cited

U.S. PATENT DOCUMENTS 6,710,489 B1 3/2004 Gabrys
7,608,952 B2 * 10/2009 Weldon ................... F16N 15/00
310/80

(Continued)

FOREIGN PATENT DOCUMENTS

WO 2012154066 A1 11/2012

OTHER PUBLICATIONS

Search Report and Written Opinion of PCT/IB2017/054009 dated Aug. 28, 2017.

*Primary Examiner* — Tulsidas C Patel
*Assistant Examiner* — Rashad H Johnson
(74) *Attorney, Agent, or Firm* — Silvia Salvadori, P.C.; Silvia Salvadori (57) ABSTRACT

A flywheel kinetic accumulator provides an accumulator assembly, in which a flywheel that is mounted on roll bearings rotates about a rotation axis; the flywheel is axially supported by two sets of magnetic elements (16, 16') facing each other, arranged in two parallel planes, along two circular paths having the same diameter; one set is connected to the accumulator assembly, and the other to the flywheel; the magnetic elements (16, 16') of the two sets are arranged in rotation, such that when a magnetic element (16) of the one set is aligned with a respective magnetic element (16') of the other set along an axis that is parallel to the rotation axis, all other magnetic elements (16, 16') are offset with respect to one another in order to reduce/eliminate the magnetic forces acting in the direction opposite to the rotation direction (V).

16 Claims, 8 Drawing Sheets

(51) Int. Cl.
*H02K 7/09* (2006.01)
*H02K 49/10* (2006.01)
*H02K 15/02* (2006.01)
*H02K 1/27* (2006.01)

(52) U.S. Cl.
CPC .......... *F16C 2361/55* (2013.01); *H02K 1/27* (2013.01); *H02K 15/02* (2013.01); *H02K 49/10* (2013.01); *H02K 49/102* (2013.01); *Y02E 60/16* (2013.01)

(58) Field of Classification Search
CPC .......... H02K 5/26; H02K 15/06; H02K 19/12; H02K 19/18; H02K 49/10; H02K 49/102; F16C 2361/55; F16C 32/0427; Y02E 60/16
USPC ............... 310/74, 90, 90.5, 125, 127, 128
See application file for complete search history.

(56) References Cited

U.S. PATENT DOCUMENTS

| | | | |
|---|---|---|---|
| 2018/0034356 A1* | 2/2018 | Urch | B60L 7/12 |
| 2018/0166946 A1* | 6/2018 | Walsh | H02K 7/025 |
| 2018/0351433 A1* | 12/2018 | Englander | F03G 3/08 |
| 2019/0165645 A1* | 5/2019 | Gieras | H02K 1/14 |
| 2019/0199164 A1* | 6/2019 | Gieras | H02K 7/025 |

\* cited by examiner

FLYWHEEL KINETIC ACCUMULATOR

This application is a U.S. national stage of PCT/IB2017/054009 filed on 3 Jul. 2017, which claims priority to and the benefit of Italian Application No. 102016000069910 filed on 5 Jul. 2016, the contents of which are incorporated herein by reference in their entireties.

The present invention relates to a flywheel kinetic accumulator.

It is known to use flywheel kinetic accumulators as an alternative to conventional electrochemical batteries, in order to store energy reserves where and/or when there is no electric power available.

See, for example, document US2011/0298293A1, which shows a version of a conventional accumulator.

A kinetic accumulator of the known type comprises first magnets attached to a flywheel frame, and second magnets in rotating connection with the flywheel, these magnets being provided to magnetically lift the latter. Typically, the first and second magnets are arranged at regular distance with respect to each other, around the revolution axis of the flywheel.

One of the drawbacks of this prior art relates to the magnetic forces developing from the motion of the second magnets, whereby in certain rotation steps these forces oppose the free rotation of the flywheel, thus braking it.

Clearly, this phenomenon is undesired, as this braking—or, in any case, slowing down—action corresponds to a lower amount of rotational kinetic energy stored.

In the above framework, the present invention proposes to provide a flywheel kinetic accumulator that allows to reduce or even eliminate the slowing down of the flywheel caused by the magnetic forces opposed to the desired rotation direction, as a result of the offset arrangement of its magnets.

This object is fulfilled by an accumulator according to the first claim. Preferred embodiments are shown in the subclaims.

The object of the present invention shall now be described in detail with the aid of the drawings provided as an example, without limitation, in which.

Referring to FIGS. 1-7, referral number 1 indicates as a whole a flywheel kinetic accumulator comprising an accumulator assembly 2, a flywheel 4, mechanical rolling means 6,8, and magnetic support means 10 for the flywheel 4.

Figure 1:
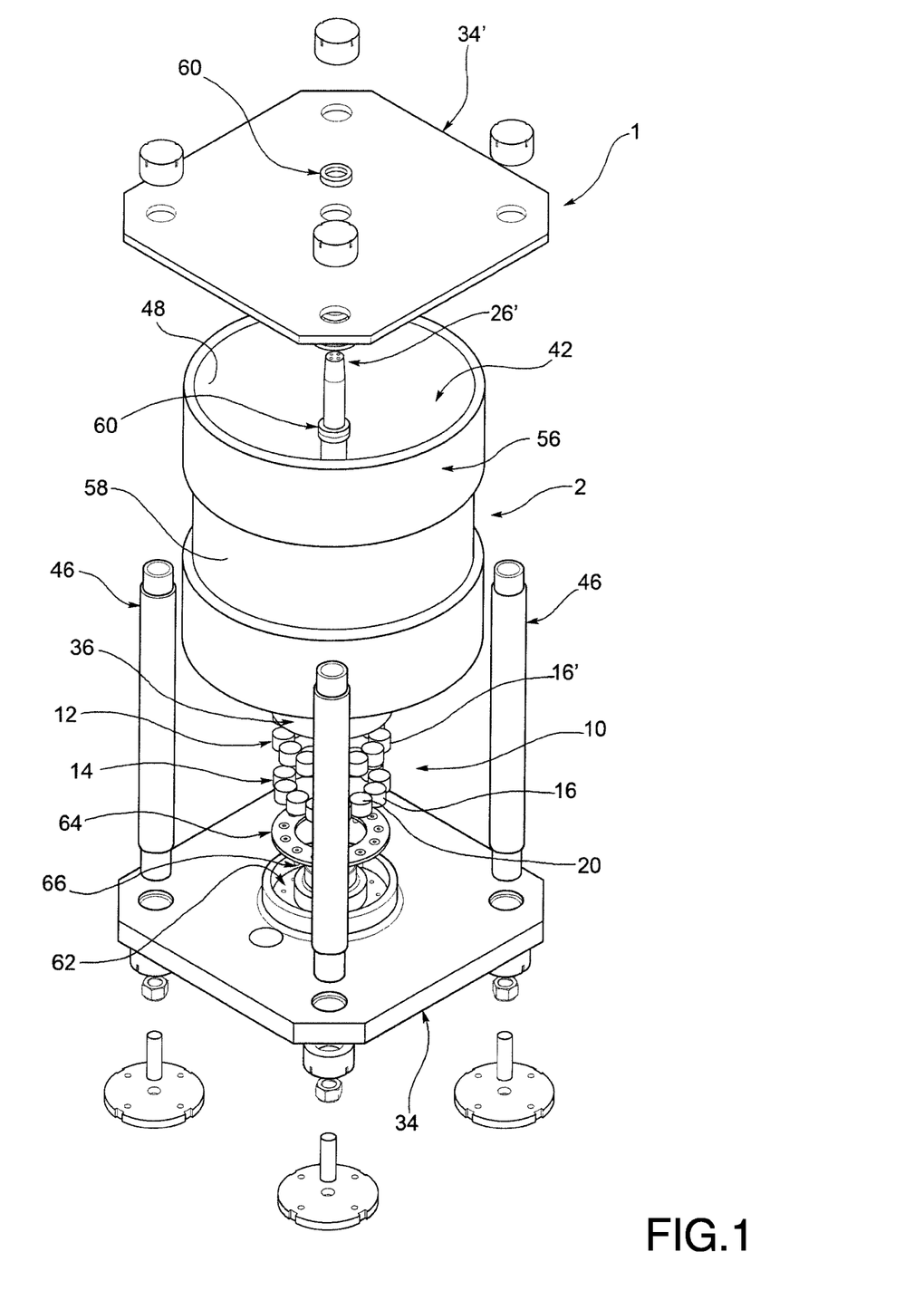
FIGS. 1,2,3 show an exploded perspective view, an exploded side view and an assembled side view in axial section, respectively, of a flywheel kinetic accumulator, subject-matter of the present invention, according to a first embodiment of the invention.
Figure 2:
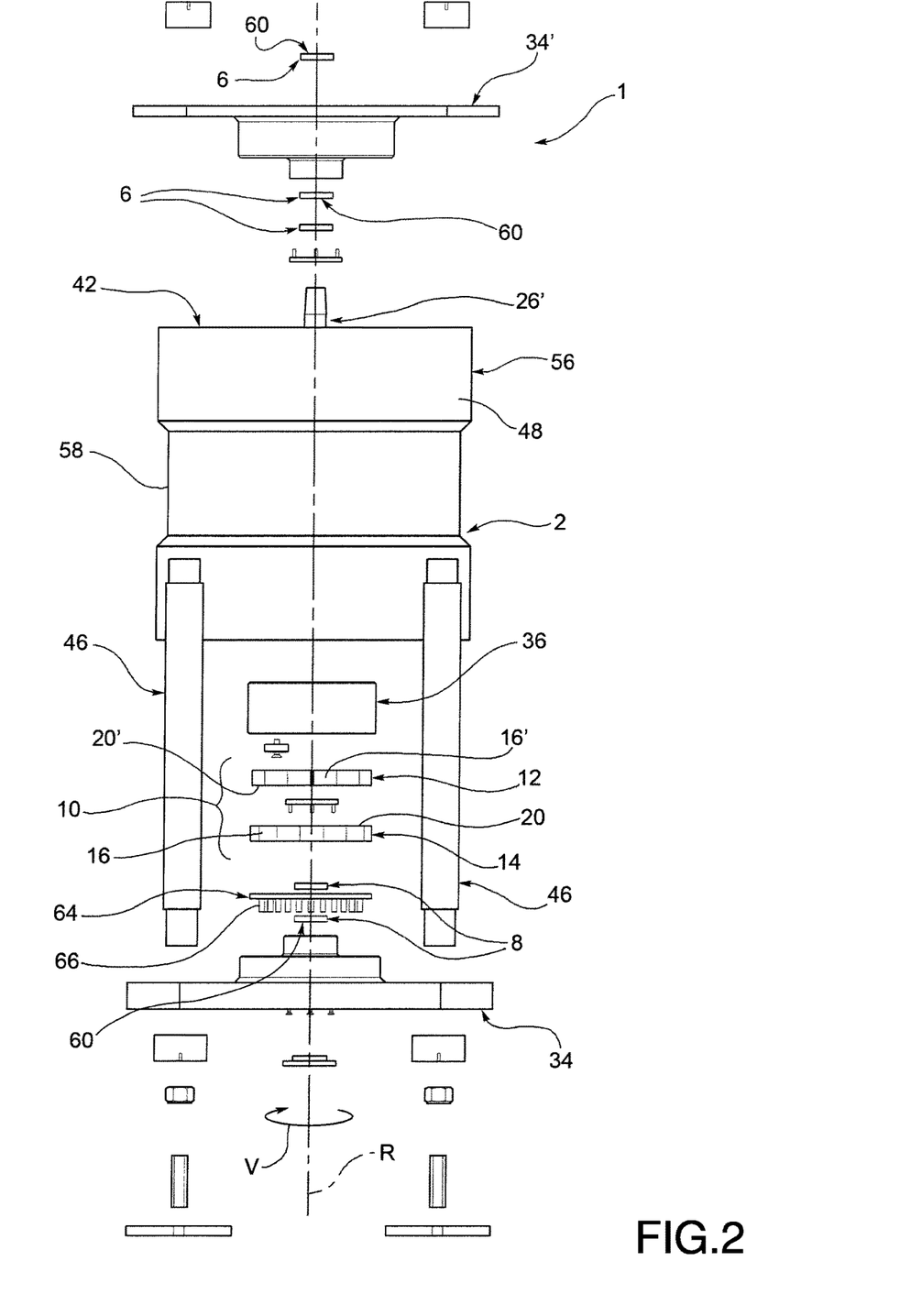
Figure 3:
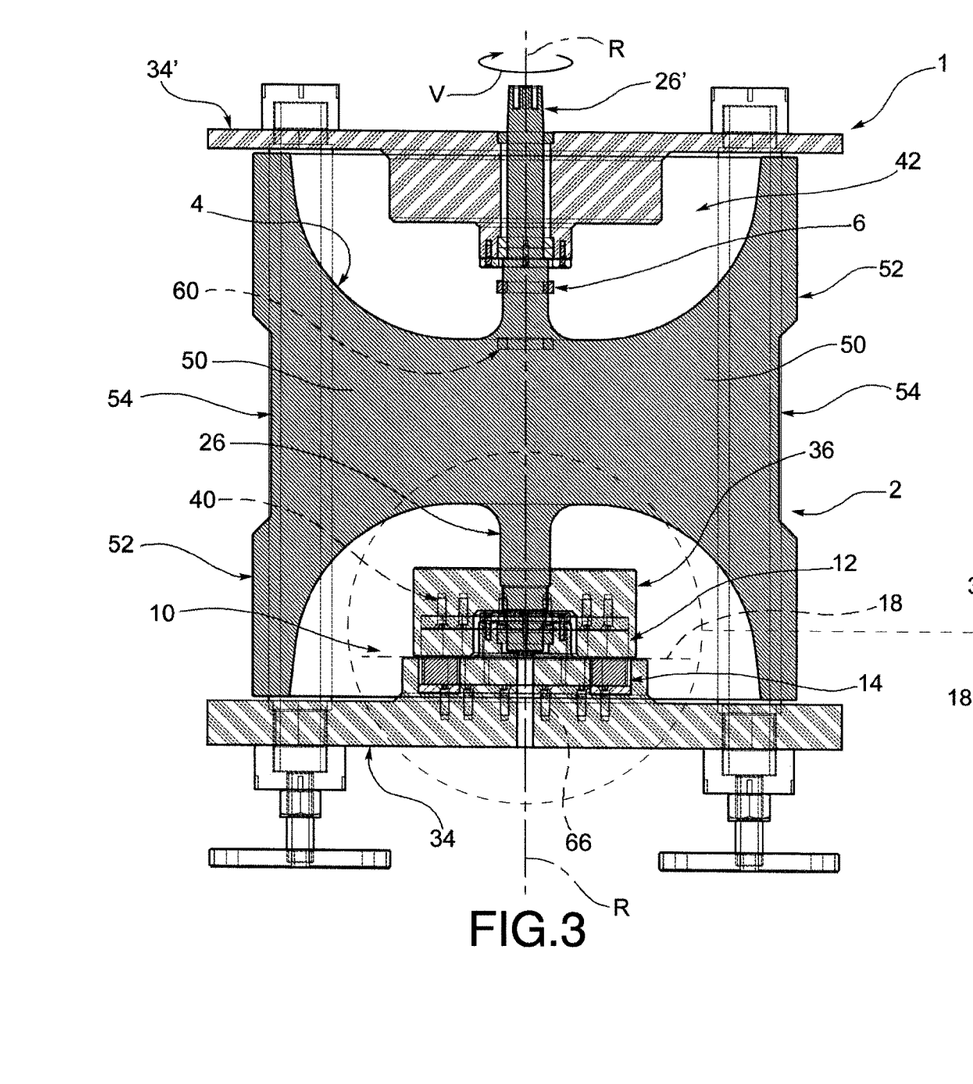

The accumulator assembly 2 defines an inner space 42 in which the flywheel is rotatable about a rotation axis R. This space 42 is open outwards, i.e., it is not hermetically sealed.

Thus, the inner space 42 is substantially at atmospheric pressure; in particular, it is neither pressurised nor under negative pressure with respect to the external environment in which the flywheel kinetic accumulator 1 is operated.

The accumulator assembly 2 provides a pair of opposing assembly walls 34,34', specifically arranged at the "axial" (this term being used with reference to the rotation axis R of the flywheel) ends of the assembly 2.

The inner space 42 is defined between the assembly walls 34,34'.

One or both assembly walls 34,34' may consist of a magnetically inert material, advantageously a polymer material optionally loaded with reinforcing fibres. Merely by way of example, the magnetically inert material is a composite material based on polylactic acid (PLA) and glass fibre.

The assembly walls 34,34' are connected by a plurality of columns or bearing members 46, having a cylindrical shape, for example.

The accumulator assembly 2 further provides a cylindrical assembly casing 56 housing the flywheel 4. The inner space 42 is defined by a casing wall 48 of such casing 56.

The flywheel 4 provides a number of flywheel blades 50 radially extending outwards from the rotation axis R. For example, in the embodiment shown in FIG. 3 there is outlined at least a pair of these diametrically opposed blades 50.

A free end 52 of at least one flywheel blade 50 is counter-shaped in respect to a wall of the accumulator assembly 2 defining the inner space 42, for example in respect to the casing wall 48.

In the embodiment in FIG. 3, the free end 52 of the flywheel blade 50 defines a peripheral cavity 54, in which there is housed a portion 58 having a radial recess towards the rotation axis of the aforesaid wall of the accumulator assembly 2.

The peripheral cavity 54 extends in a middle or central position of the flywheel blade 50, along a direction substantially parallel to the rotation axis R.

Figure 4:
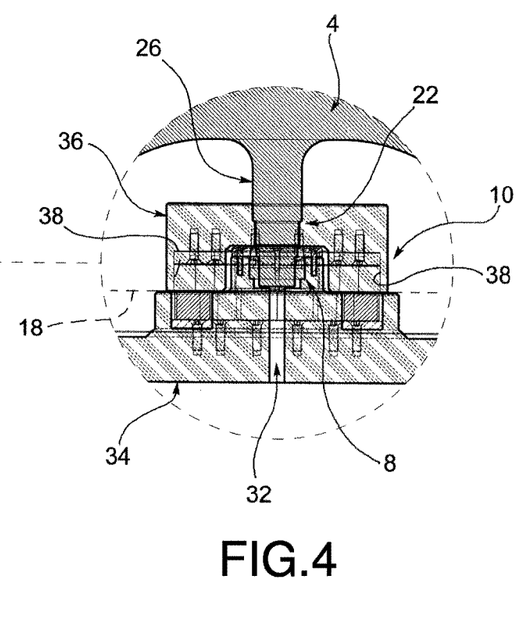
FIG. 4 illustrates the detail regarding the area highlighted in FIG. 3.

The accumulator 1 may comprise a device for detecting the weight of the flywheel 4 (device not shown), releasably fitted through an access opening 32 to the inner space 42, to detect the load resting on the mechanical rolling means 6,8.

As a result, the detecting device according to this version may be introduced in the inner space for either fine tuning or checking out periodically the accumulator, and may be removed afterwards.

FIG. 4 clearly shows the access opening 32 made out of the assembly wall 34 of the accumulator assembly 2. As mentioned above, the flywheel 4 is located in the accumulator assembly 2 so as to rotate about the rotation axis R, for example oriented in a substantially or generically vertical direction, in a desired rotation direction V.

It is to note that for the purpose of the present invention, the rotation direction V—be it clockwise or counter-clockwise—is irrelevant.

Advantageously, the flywheel 4 comprises a rotation shaft 26 connecting the same with the accumulator assembly 2.

The rotation shaft 26 is engaged or fitted in the opposing assembly walls 34, 34', and axially protrudes beyond the flywheel blades 50, to engage the accumulator assembly 2.

A shaft end 26' protrudes outside of the inner space 42, to connect the flywheel 4 with an external motor (not shown), for example by coupling. The shaft end 26' passes through the whole thickness of the assembly wall 34' and may possibly protrude outside of the assembly 2.

The mechanical rolling means 6,8 are mounted between the accumulator assembly 2 and the flywheel 4 (and more specifically between the rotation shaft 26 and said assembly 2), for guiding the rotation of the latter.

The mechanical rolling means 6,8 provide spherical or cylindrical bodies made at least partially from a magnetically inert material, for example a ceramic material.

More specifically, these bodies are integrated into bearings 60 mounted either on the flywheel 4 or on the rotation axis 26, coaxially with the rotation axis R. As regards the magnetic support means 10 of the flywheel 4, these means provide at least two sets 12,14 of magnetic elements 16,16' facing each other, these elements being arranged at a distance from each other around the aforesaid rotation axis R.

For example, the magnetic elements 16,16' comprise a plurality of permanent magnets, for example in neodymium.

In the embodiment shown in the drawings, the sets 12,14 of magnetic elements 16,16' have the same polarity, so as to repel each other along the rotation axis R or parallel thereto.

In an embodiment not shown, the sets of magnetic elements may have opposing polarities, so as to attract each other along the rotation axis R or parallel thereto.

In the outlined embodiment, the accumulator 1 provides an upper set 12 and a lower set 14 of said elements—according to the orientation of the Figures.

Thus, the magnetic support means 10 are either assigned or designed to magnetically support at least part of the weight load of the flywheel 4 acting on the mechanical rolling means 6,8, and thus to partially or completely relieve the latter of the weight of the flywheel 4.

Figure 5:
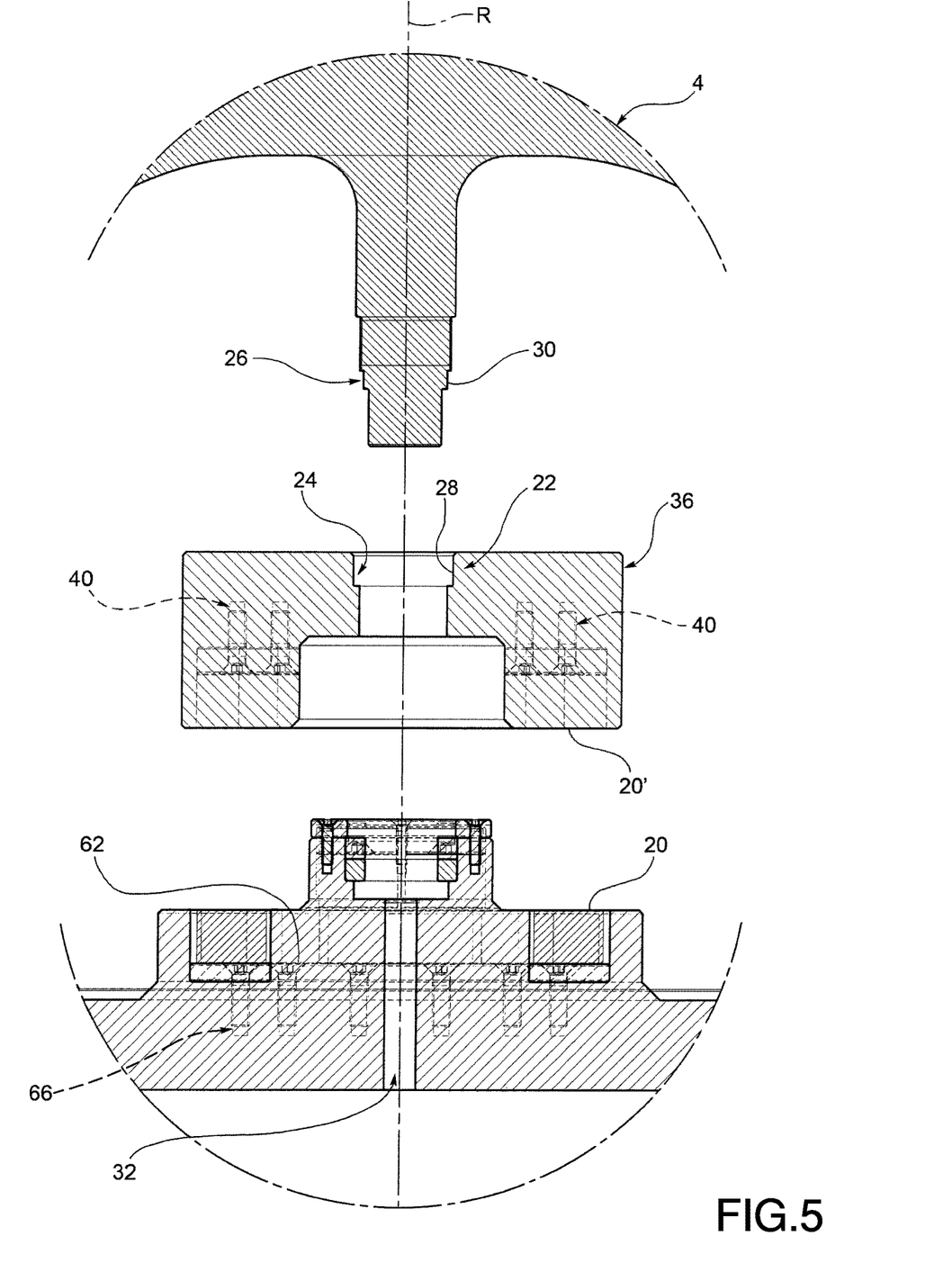
FIG. 5 shows an enlarged exploded view of the detail in FIG. 4.

One set of magnetic elements 14 is connected to the accumulator assembly 2 and the other set of magnetic elements 12 is connected to the flywheel 4, and these sets define a magnetic support space 18 therebetween. More specifically, the magnetic elements 16,16' identify magnet surfaces 20,20', facing each other and defining the magnetic support space 18.

Figure 6:
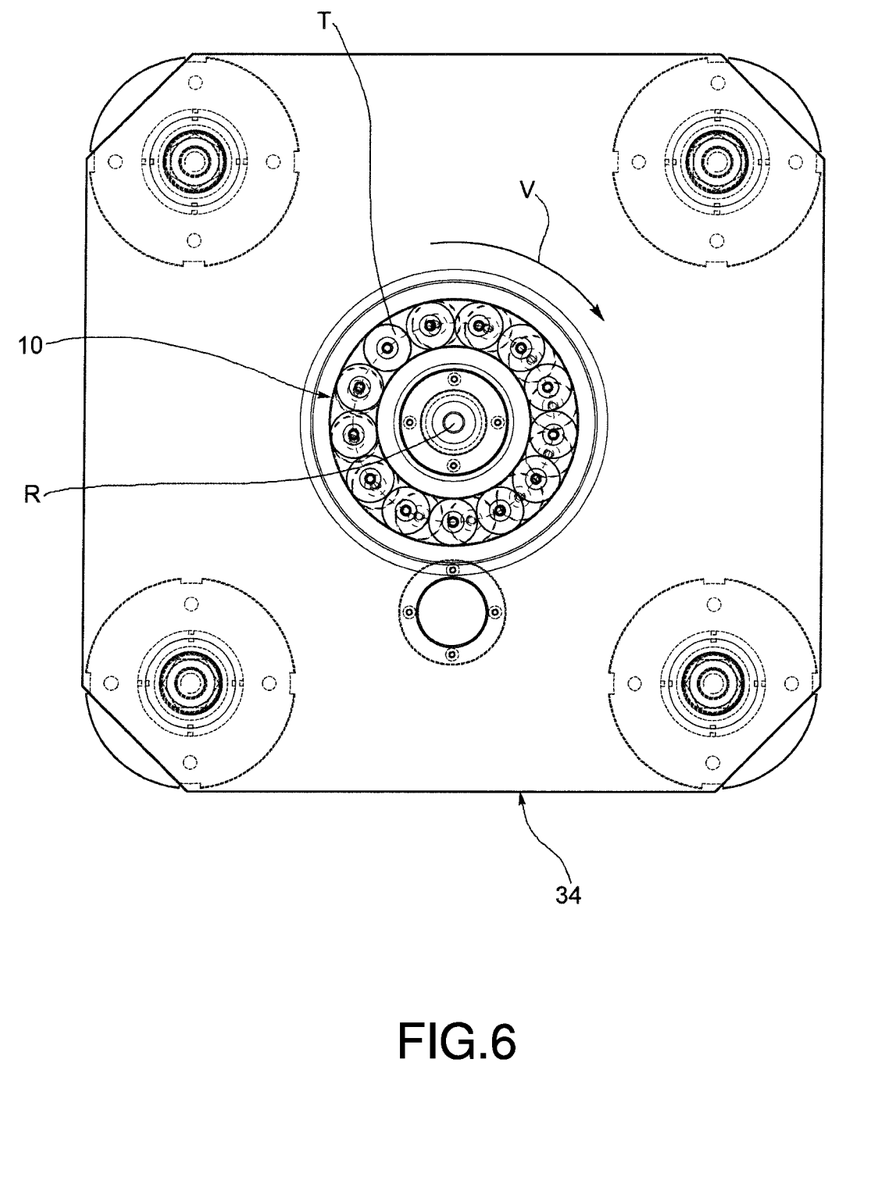
FIG. 6 shows a plan view of a lower assembly wall according to the orientation in FIG. 1, in which there is laid out also the perimeter of a set of magnetic elements, associated with the flywheel.
Figure 7:
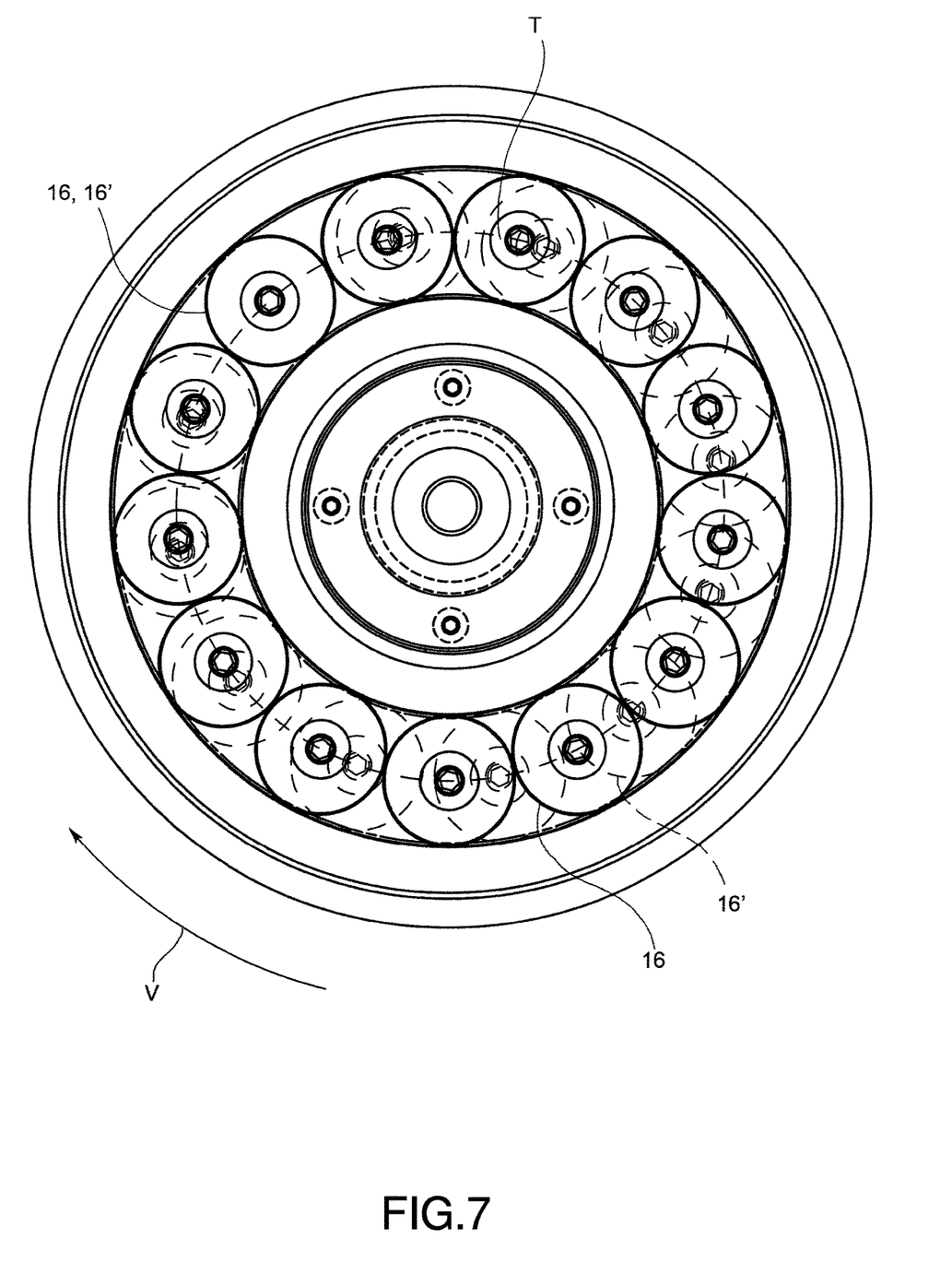
FIG. 7 shows an enlargement of FIG. 6, in which there is clearly visible the offset arrangement of the magnetic elements.

The magnet surfaces 20,20' have substantially the same conformation (e.g., the same surface area and/or the same external geometry) for both sets 12,14. In the example shown, the magnet surfaces 20,20' are circular. Each of the magnetic elements 16,16' has a cylindrical shape and is the same size in respect to the other, and the two sets 12,14 of magnetic elements 16,16' are arranged in two respective parallel planes along respective circular paths T having the same diameter, centred on the rotation axis R. The number of magnetic elements 16 is different from that of the magnetic elements 16': in the example shown, the magnetic elements 16 are thirteen, and the magnetic elements 16' are twelve. Moreover, the magnetic elements 16 are arranged at a regular mutual angular distance, whereas the magnetic elements 16' are arranged at different mutual angular distances.

Referring to the illustration in FIG. 7, the magnetic elements 16,16' of the two sets 12,14 are arranged in such a way that when a magnetic element 16' of the one set 12 is aligned and geometrically overlapped with a respective magnetic element 16 of the other set 14 along an axis that is parallel to the rotation axis R, all other magnetic elements are offset with respect to one another in order to reduce/eliminate the magnetic forces acting in the direction opposite to the rotation direction V.

As a result, the aforesaid offset arrangement allows to avoid that all magnetic elements of one set simultaneously couple/decouple with/from the elements of the other set, and, consequently, that they brake or slow down the rotation of the flywheel.

In other words, since at any moment there is only one element 16' positioned in front of the respective magnetic element 16, magnetic repulsions are consequently reduced, as the magnetic elements already decoupled are not subject (or are less strongly subject) to a return in the direction opposed to the rotation direction V.

The kinetic accumulator 1 comprises a flywheel drum 36, in rotating connection with the flywheel 4, out of which there is made a housing seat 38 in which the magnetic elements 16' of the flywheel 4 are fitted.

The flywheel drum 36 may be made at least partially from a magnetically inert material, advantageously from a polymer material optionally loaded with reinforcing fibres.

Merely by way of example, the magnetically inert material may comprise a composite material based on polylactic acid (PLA) and glass fibre.

The flywheel drum 36 provides first coupling members of the magnetic elements 16', arranged at the housing seat 38 of the magnetic elements 16'.

In particular, each magnetic element 16' is provided with a metal threaded coupling pin 40 integrated therein, especially screwed in a magnetically inert material of said drum 36.

More specifically, each pin 40 provides a portion that is magnetically attractable by the magnetic element 16', to retain said element 16' in said seat 38 through the magnetically active action of the element 16' itself.

The accumulator assembly 2 defines a seat 62 in which the magnetic elements 16 are housed.

The seat 62 is made out of the assembly wall 34. The seat 62 extends annularly about the rotation axis R.

At the seat 62, the accumulator assembly 2 provides second coupling members incorporated in a magnetically inert material of said assembly.

More specifically, the second coupling members provide a punched annular flange 64 in whose holes there is fitted a set of metal threaded pins 66 that are screwed in the seat 62. Each threaded pin 66 is a portion magnetically attractable by a corresponding magnetic element 16 to retain said element 16 in said seat 62 through the magnetically active action of the element 16 itself.

The accumulator 1 also provides means 22 for adjusting the axial distance between the two sets 12,14 of magnetic elements 16,16', and thus the width of the magnetic support space 18.

In other words, by adjusting the axial distance it is possible to determine the repulsive force between the two sets of magnets, based on the weight load with which the flywheel 4 is intended to rest on the mechanical rolling means 6,8.

The adjustment means 22 are formed by a hole 24 made out of the flywheel drum 36 and having a threaded portion 28 cooperating with a complementary threaded portion 30 arranged at the rotation shaft 26, or arranged at the set 12 of magnetic elements 16' associated to the flywheel 4. By rotating the flywheel drum 36 with respect to the rotation shaft 26 it is possible to adjust the axial distance between the two sets of magnets. Next, the flywheel drum 36 may be held on the rotation shaft 26, in the position required, by means of one or more radial pins, not shown.

Figure 8:
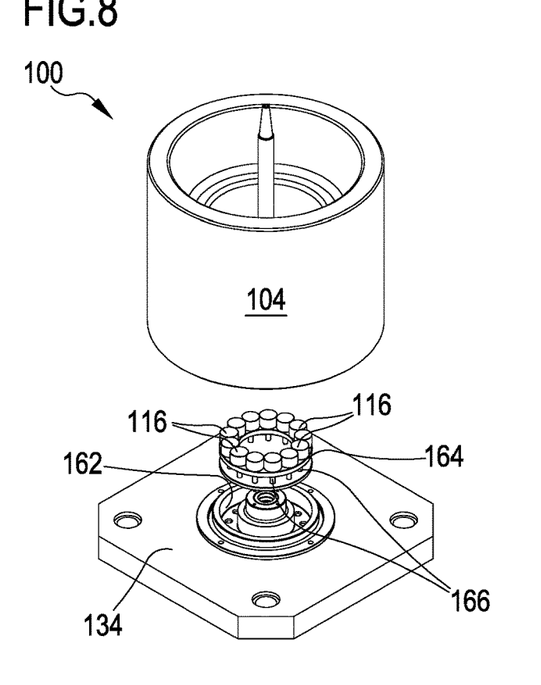
FIGS. 8,9,10 show an exploded perspective view, an exploded side view and an assembled side view in longitudinal section, respectively, of the main parts of a flywheel kinetic accumulator, subject-matter of the present invention, according to a second embodiment.
Figure 9:
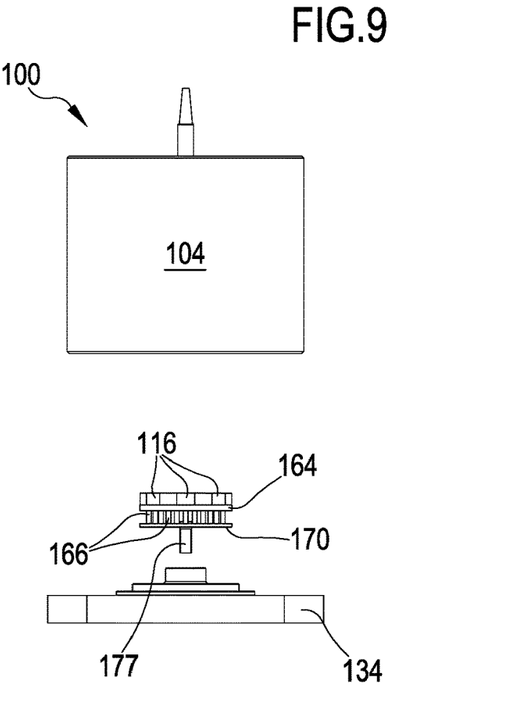
Figure 10:
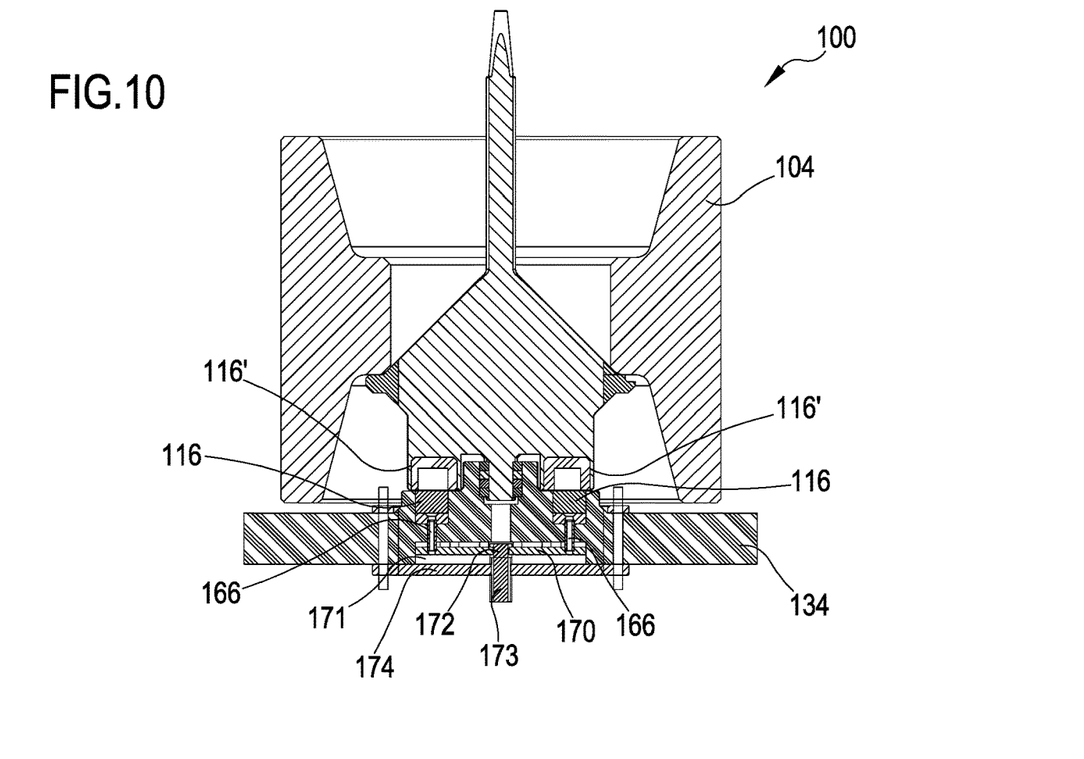

FIGS. 8-10 show a flywheel kinetic accumulator similar to the accumulator 1, but with a different adjustment of the axial distance. In these Figures, some parts of the accumulator assembly 2 are omitted. The flywheel kinetic accumulator as shown in FIGS. 8-10 is generically indicated with 100.

The accumulator 100 also provides a base wall 134, having an annular set of magnetic elements 116 being disposed in a seat 162 thereof, and pivotally supporting a flywheel 104 having another set of magnetic elements 116' mounted thereon.

In this case, too, it is provided that the magnetic elements 116 are fixed to the flywheel 104 by means of threaded pins, and that the magnetic elements 116' are fixed to the base wall 134 by means of both a punched annular flange 164 and some threaded pins 166. In this case, however, the assembly consisting of magnetic elements 116', flange 164 and pins 166, is mounted on a plate 170 housed in a lower seat 171 of the base wall 134. The plate 170 is provided with a threaded shank 172 that is screw-coupled with an internally threaded bush 173 fixed to the base wall 134 by means of an additional plate 174. By rotating the plate 170, such plate is either lifted or lowered in the seat 171, so as to lift or lower the magnetic elements 116, and adjust the axial distance between the two sets of magnets 116,116'. Next, the plate 170 is held in the required position by means of a nut, not shown, which is screwed to the free end of the threaded shank 172 and stops against the bush 173.

Figure 11:
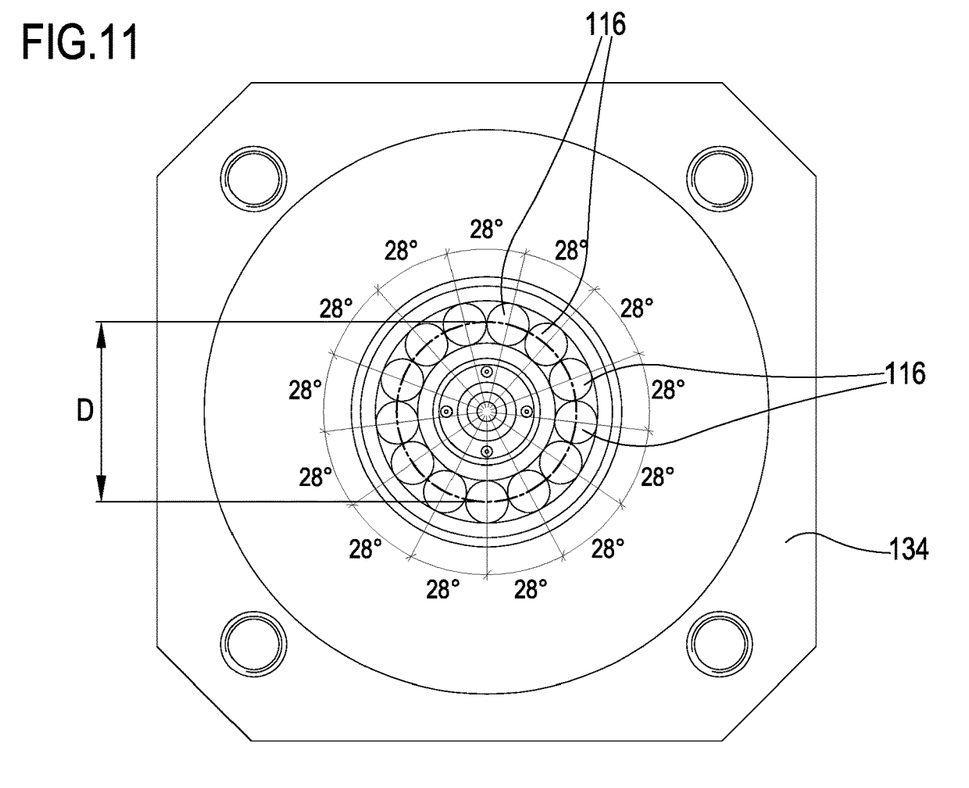
FIGS. 11,12 show two sectional top and bottom plan views, respectively, of the flywheel accumulator in FIGS. 8,9,10.

FIG. 11 shows the magnetic elements 116 in detail. These magnetic elements 116 have a cylindrical shape, are thirteen, and are arranged along a circular path having a diameter D intersecting the axes of the magnetic elements 116. Moreover, the magnetic elements 116 are arranged at the same angular distance with respect to each other, in this example 28°.

Figure 12:
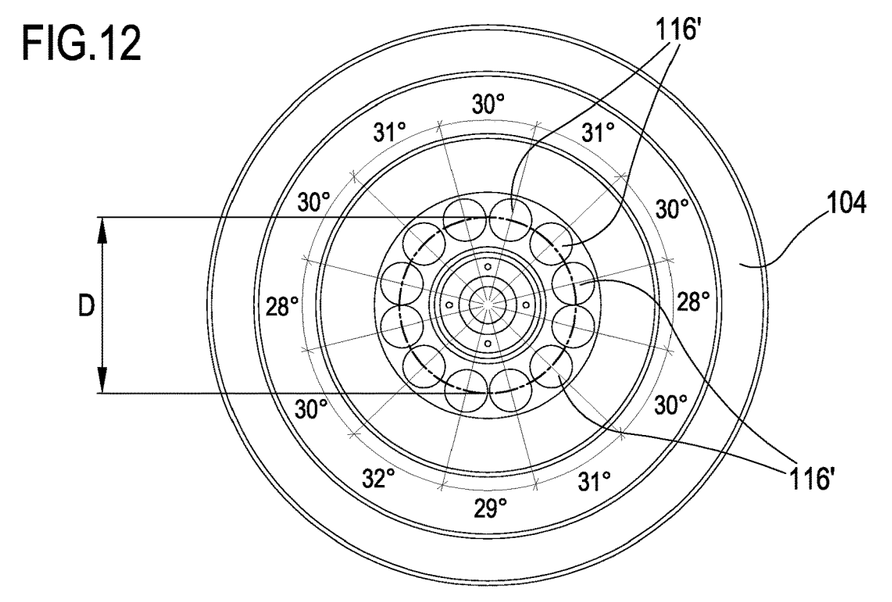

FIG. 12 rather shows the magnetic elements 116' in detail. These magnetic elements 116' also have a cylindrical shape, but are twelve, and are arranged along a circular path always having a diameter D—as the previous one—intersecting the axes of these magnetic elements 116'. Unlike the magnetic elements 116, however, the magnetic elements 116' are arranged at different angular distances, in this example ranging from 28° to 32°.

The kinetic accumulators described above are suitable for overcoming the drawbacks reported above.

More specifically, the accumulators illustrated above allow to reduce or eliminate the magnetic return forces acting between magnets of opposite sets, so as to store higher quantities of energy—all other features being equal—than the systems currently in use.

Advantageously, the accumulators described above have been designed to work at ambient pressure, thus abandoning any expensive systems for the generation or maintenance either of a vacuum or of pressurization. Advantageously, the accumulators described above allow to achieve an offset arrangement of the magnets in a simple, rational way.

Advantageously, the accumulators described above provide an adjustment system that is very rapid to use, and robust, thanks to its simple construction.

Advantageously, the accumulators present a magnet fixation system which requires no special processing, but which turns out to be extremely advantageous thanks to the magnetic action employed.

Advantageously, in the accumulators described above the parts adjacent to the magnets are not influenced by the field thus generated, and in no way affect the magnetic support of the flywheel.

Advantageously, the accumulators described above may utilize lubricated or non-lubricated rolling means, without distinction, depending on the circumstances. Advantageously, the accumulators described above are suitable for being rapidly adjusted or modified, so as to cope with any changed design needs.

The elements forming part of the embodiments of the kinetic accumulators described above may be changed or substituted with other functionally equivalent ones by those skilled in the art, in order to meet special needs.

These variations, too, fall within the scope of protection as defined by the following claims.

Moreover, each variation described as belonging to a possible embodiment, may be implemented independently of any other variation described.

The invention claimed is:

1. Flywheel kinetic accumulator comprising:
an accumulator assembly;
a flywheel, arranged in said assembly so as to rotate about a rotation axis in a desired rotation direction,
mechanical rolling elements, mounted between the accumulator assembly and the flywheel, for guiding the rotation of the latter,
magnetic support elements of the flywheel, comprising at least two sets of magnetic elements facing each other and magnetically interacting with each other, arranged in two respective parallel planes, along two respective circular paths having the same diameter, at a distance from each other around said rotation axis,
said sets being one connected to the accumulator assembly and the other to the flywheel, and defining a magnetic support space therebetween,
wherein the magnetic elements of the two sets are arranged such that when a magnetic element of the one set is aligned and geometrically overlapped with a respective magnetic element of the other set along an axis that is parallel to the rotation axis, all other magnetic elements are offset with respect to one another in order to reduce/eliminate the magnetic forces acting in the direction opposite to the rotation direction,
and wherein:
the magnetic elements of one of said sets have a regular mutual angular distance; and
the magnetic elements of the other of said sets have a different mutual angular distance with respect to one another.

2. Kinetic accumulator according to claim 1, wherein one of said sets comprises a number of magnetic elements that is different from the number of magnetic elements of the other set.

3. Kinetic accumulator according to claim 1, wherein the magnetic elements identify magnet surfaces facing each other and defining the magnetic support space, and having substantially the same conformation for both sets.

4. Kinetic accumulator according to the claim 1, wherein when the magnetic element of one set is aligned with the respective magnetic element of the other set, a single pair of magnet surfaces is overlapping and coinciding in a direction substantially parallel to the rotation axis.

5. Kinetic accumulator according to claim 1, wherein the set of magnetic elements associated with the flywheel is movable along a circular path centered on the rotation axis, and wherein the set of magnetic elements associated with the accumulator assembly is distributed along the same path.

6. Kinetic accumulator according to claim 1, wherein the sets of magnetic elements have the same polarity, so as to repel each other along the rotation axis or parallel thereto.

7. Kinetic accumulator according to claim 1, comprising an arrangement for adjusting the distance between the two sets of magnetic elements.

8. Kinetic accumulator according to claim 7, wherein the adjustment arrangement comprises a hole made out of a flywheel drum and provided with a threaded portion cooperating with a complementary threaded portion arranged at the rotation shaft.

9. Kinetic accumulator according to claim 7, wherein the adjustment arrangement comprises a support plate for a set of magnetic elements housed in a base wall of the accumulator assembly, wherein the plate is provided with a threaded shank that is screw-coupled with an internally threaded bush fixed to the base wall.

10. Kinetic accumulator according to claim 1, comprising a device for detecting the weight of the flywheel, releasably fitted through an access opening to an inner space, made out of a base wall of said accumulator assembly to detect the load resting on the mechanical rolling elements.

11. Kinetic accumulator according to claim 1, comprising a flywheel drum, in rotating connection with the flywheel, that defines housing seats in which the magnetic elements of the flywheel are at least partially fitted, the said drum optionally being made at least partially from a magnetically inert material.

12. Kinetic accumulator according to claim 1, wherein at one or more housing seats of the magnetic element a flywheel drum comprises first coupling members at least partially incorporated in a magnetically inert material of said drum, wherein the first coupling members comprise a portion that is magnetically attractable by the magnetic element, to retain said element in said seat.

13. Kinetic accumulator according to claim 1, wherein the accumulator assembly comprises a base wall out of which there is made one or more housing seats for the magnetic element, wherein the base wall comprises second coupling members incorporated at least partially in a magnetically inert material of said housing seat, wherein the second coupling members comprise a portion that is magnetically attractable by the magnetic element, to retain said element in said seat.

14. Kinetic accumulator according to claim 1, wherein the rotation axis is oriented in an approximately vertical direction, and wherein the magnetic support elements are designed to magnetically support at least part of the weight load of said flywheel acting on the mechanical rolling elements.

15. Kinetic accumulator according to claim 1, wherein:
the mechanical rolling elements comprise spherical or cylindrical bodies made at least partially from a magnetically inert ceramic material; and
the magnetic elements comprise a plurality of permanent magnets, optionally comprising neodymium.

16. Kinetic accumulator according to claim 1, wherein the accumulator assembly defines an outwardly open inner space, at atmospheric pressure, in which the flywheel is rotatable.

\* \* \* \* \*